No. 695,710. Patented Mar. 18, 1902.
J. B. ENTZ.
STORAGE BATTERY.
(Application filed July 9, 1900.)
(No Model.)
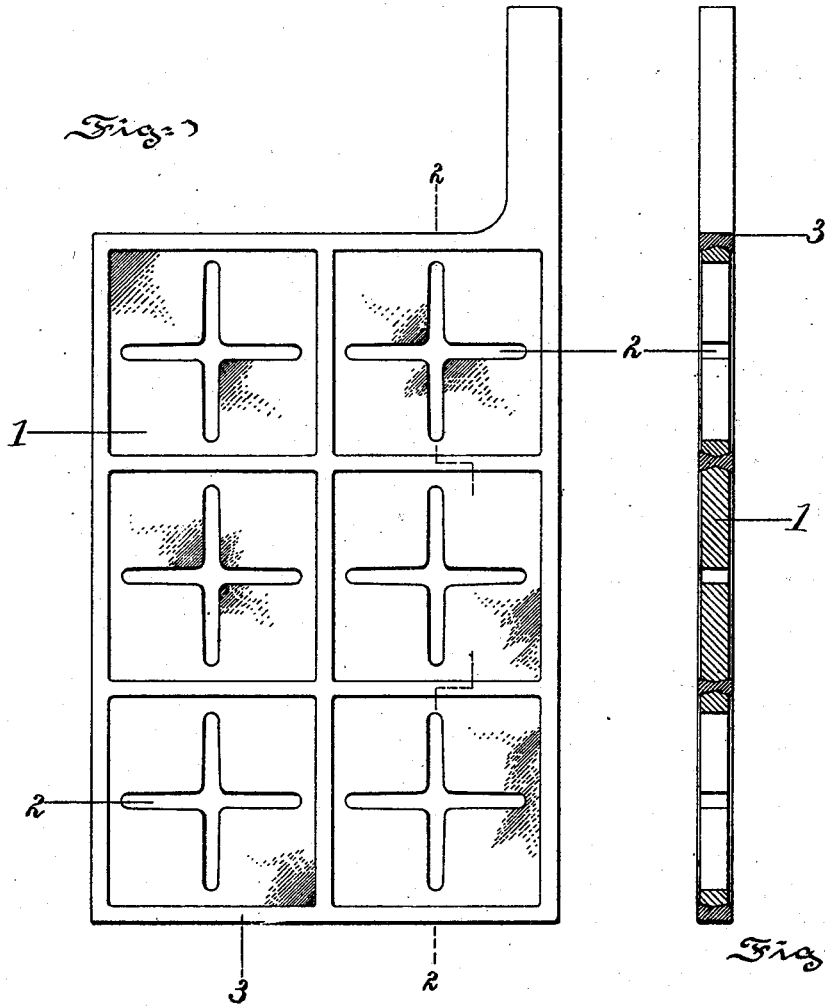
Witnesses:
J. W. Jackson
Dora Sternberger.
Inventor.
Justus B. Entz.
By
Augustus B. Stoughton
Attorney

UNITED STATES PATENT OFFICE.

JUSTUS B. ENTZ, OF PHILADELPHIA, PENNSYLVANIA.

STORAGE BATTERY.

SPECIFICATION forming part of Letters Patent No. 695,710, dated March 18, 1902.

Application filed July 9, 1900. Serial No. 23,059. (No model.)

*To all whom it may concern:*

Be it known that I, JUSTUS B. ENTZ, a citizen of the United States, and a resident of the city of Philadelphia, in the county of Philadelphia and State of Pennsylvania, have invented a certain new and useful Improvement in Storage Batteries of which the following is a specification.

The object of this invention is to provide for the expansion or growth of the active material or material to become active and to provide additional surface.

To these and other ends the invention comprises the improvements hereinafter described and claimed.

The nature, characteristic features, and scope of the invention will be more fully understood from the following description, taken in connection with the accompanying drawings, forming part hereof, and in which—

Figure 1 is a side elevational view of a plate embodying features of my invention, and Fig. 2 is a sectional view taken on the line 2 2 of Fig. 1.

In the drawings, 1 is a piece or pellet of active material or material adapted to become active. The pellet may be made of chlorid of lead reduced to the metallic state in the usual manner for use as a negative pole-plate. The pellet is slotted or cut away so as to permit of its expansion or growth and so as to increase its surface.

2 designates the slot, which is cruciform and is confined within the edges of the pellet. The form of the slot 2 may be modified or varied so long as it is generally cruciform.

A number of the described pellets or pieces of active material or material to become active are mounted in the usual manner within a frame or conducting-support 3, which surrounds and is fitted to their peripheries. In use the slots 2 compensate for expansion and contraction of the active material or material to become active, and they also increase the surface of such material and to that extent improve the plate or electrode.

Having thus described the nature and objects of my invention, what I claim as new, and desire to secure by Letters Patent, is—

A plate or electrode consisting of pellets or pieces of active material or material adapted to become active having cruciform slots extending from face to face through them and nearly across them, and a frame or support fitted to said pellets, substantially as described.

JUSTUS B. ENTZ.

Witnesses:
W. J. JACKSON,
K. M. GILLIGAN.